United States Patent [19]

Cognolato et al.

[11] Patent Number: 5,047,076

[45] Date of Patent: Sep. 10, 1991

[54] METHOD OF FABRICATING OPTICAL FIBRES BY SOLUTION-DOPING

[75] Inventors: Livio Cognolato, Baldissero; Angelantonio Gnazzo, Alessandria, both of Italy

[73] Assignee: SIP - Societa Italiana per L-Esercizio Delle Telecommunicazioni P.A., Turin, Italy

[21] Appl. No.: 445,382

[22] Filed: Dec. 4, 1989

[30] Foreign Application Priority Data

Dec. 7, 1988 [IT] Italy ................. 68096 A/88
Aug. 24, 1989 [IT] Italy ................. 67715 A/89

[51] Int. Cl.⁵ ............................ C03C 25/02
[52] U.S. Cl. ........................ 65/3.12; 65/901; 65/3.14; 65/30.13; 65/18.2
[58] Field of Search ......... 65/3.12, 3.14, 3.11, 65/30.13, 60.3, 18.2, 901

[56] References Cited

U.S. PATENT DOCUMENTS

| | | | |
|---|---|---|---|
| 3,961,926 | 6/1976 | Asam | 65/30.13 |
| 4,009,014 | 2/1977 | Black et al. | 65/3.12 |
| 4,203,743 | 5/1980 | Suganuma et al. | 65/13 |
| 4,263,030 | 4/1981 | Kobayashi et al. | 65/2 |
| 4,610,708 | 9/1986 | Sarhangi | 65/3.12 |
| 4,657,575 | 4/1987 | Roba | 65/3.12 |
| 4,728,350 | 3/1988 | Cocito | 65/3.12 |
| 4,786,302 | 11/1988 | Osafune et al. | 65/3.11 |
| 4,799,946 | 1/1989 | Ainslie | 65/3.12 |
| 4,826,288 | 5/1989 | Mansfield | 65/3.12 |
| 4,848,998 | 7/1989 | Snitzer | 65/3.11 |
| 4,921,516 | 5/1990 | Roba | 65/3.12 |

FOREIGN PATENT DOCUMENTS

| | | |
|---|---|---|
| 2500109 | 8/1982 | France . |
| 57-035131 | 7/1982 | Japan . |
| 7116691 | 6/1973 | Netherlands ........ 65/3.11 |

OTHER PUBLICATIONS

Abstract of Japanese Patent 63-17234, 25 Jan., 1988.
Optical Fiber Communication Conference 1988 Technical Digest Series, vol. 1 —p. 98, Jan. 25-28, 1988.
"Solution-Doping Technique for Fabrication of Rare--Earth Doped Optical Fibres", by J. E. Townsend et al., Electronics Letters, 26 Mar. 1987, vol. 23, No. 7, pp. 329-331.

*Primary Examiner*—Richard V. Fisher
*Assistant Examiner*—John J. Bruckner
*Attorney, Agent, or Firm*—Herbert Dubno

[57] ABSTRACT

Silica intended to form the core of an optical-fibre preform is deposited as an unvitrified soot inside a reaction tube, where a non-aqueous solution of dopant precursor(s) is then introduced without removing the tube from the lathe. The precursor(s) of the dopant(s) are dissolved in an anhydrous organic solvent. The solution containing the dopant precursor(s) is introduced into the reaction tube without removing the tube from the lathe so that the solution covers the whole surface of the deposited soot layer and impregnation of the deposited soot layer occurs.

17 Claims, 4 Drawing Sheets

METHOD OF FABRICATING OPTICAL FIBRES BY SOLUTION-DOPING

FIELD OF THE INVENTION

The present invention refers to the industrial manufacture of physical carriers for optical telecommunications and more particularly to a method of doping the core of silica optical-fiber preforms by the solution-doping technique, to a method of fabricating optical-fiber preforms, to a method of fabricating optical fibers, utilizing a core doping method.

BACKGROUND OF THE INVENTION

Optical fiber for telecommunications comprise an outer part (cladding) of vitreous silica and an inner part (core) of silica doped with metal oxides having higher refractive index. Doping is generally performed by deposition techniques, such as CVD (Chemical Vapor Deposition).

Among the dopants, used are metal oxides which considerably raise the refractive index even in limited concentration and which, unlike germania, generally used for such fibers, do not give rise to the central refractive-index depression (dip) typical of fiber fabricated by deposition techniques. An example of such dopants is alumina.

Other dopants, such as rare earths, which modify the fiber emission or absorption characteristics so as to permit the fibers to be used as sensors, amplifiers or lasers in particular spectral regions, in particular in the infrared region, are often desiderably added to the dopants increasing the core refractive index.

The use of deposition techniques for manufacturing optical fibres of this kind gives rise to problems in the choice of reactants yielding the dopants, chiefly when alumina is dealt with, since no inorganic salts of aluminium exist which are liquid at ambient temperature and are easy to handle like $SiCl_4$ or $GeCl_4$. It is then necessary to use compounds with a melting point higher than 100° C. and heated lines which presents a certain degree of complexity degree. As an alternative, organometallic salts of Al exist which are gaseous or liquid under normal conditions, but the chemical stability thereof is rather reduced. The same problem of unavailability of compounds with the desired characteristics is encountered when dealing with rare earths.

To solve these problems, it has been proposed to dope silica by using solutions of compounds of the dopant precursors. This technique has been described by J. E. Townsend, S. B. Poole and D. N. Payne in the article entitled "Solution-doping technique for fabrication of rare-earth doped optical fibres", Electronics Letters, Mar. 26th, 1987, Vol. 23, No. 7, pages 329-331.

According to the technique described in the cited paper, a number of layers of vitreous silica and other oxides are deposited in soot form inside a support tube, in an ambient isolated from the outside. The tube is subsequently removed from the lathe and the unvitrified layers are impregnated with aqueous solutions of compounds (in particular halides) of the rare earths or other required metals. The tube with the impregnated silica is rinsed with acetone to remove excess water, replaced in the lathe and submitted to a hightemperature treatment with Cl2 Core vitrification and preform collapsing are then effected in conventional manner.

This technique gives rise to a number of problems due to the use of aqueous solutions and to the tube removal from the lathe.

The use of aqueous solutions renders the vitreous matrix highly polluted with OH-groups, which are not completely removed by the elimination of excess water and dehydration with Cl2. Due to the presence of the OH-groups, the fibers have high attenuation. Besides, aqueous solutions are also unsuitable when the doping metal hydrolyzes yielding corresponding oxyacids or hydroxides. This is the case with aluminum, which is a very suitable dopant for the core of silica optical fibers for telecommunications, but whose compounds generally used as dopant precursors (e.g. $AlCl_3$) violently react in $H_2O$.

Tube removal from the lathe causes contamination of the deposited material due to contact with the atmosphere of the production environment, and this reduces or even annuls the advantages of deposition in a closed environment. Moreover, the removal of the tube from and its subsequent replacement on the lathe are operations of a certain complexity, since they require cutting and resoldering of the glass tube; furthermore, these operations create further pollutions and are quite time-consuming, thus increasing manufacturing costs.

OBJECT OF THE INVENTION

The object of the present invention is to provide a solution-doping method which does not use aqueous solutions of the dopant precursors, and hence solves the problems deriving from the presence of hydroxyl groups and from the hydrolysis of the used compounds, and which does not require tube removal from the lathe.

SUMMARY OF THE INVENTION

The present invention provides a method of doping the core of silica optical-fiber preforms, wherein vitreous soot layers, intended to form the preform core and contained inside a reaction tube mounted on a lathe, are impregnated with a solution of a precursor of at least a first dopant capable of rising the refractive index of the layers without producing a central dip of the index. According to the invention the first dopant precursor solution used is a solution in an organic anhydrous solvent and, for the impregnation, after said layer deposition, the reaction tube is disconnected from both the reactant introduction conduit and the exhaust conduit for the volatile reaction products. At least the end of the tube through which reaction volatile products are exhausted is sealed, while maintaining, during the sealing operation, a flow of anhydrous and inert gas in the tube. The solution is subsequently introduced into the tube without removing it from the lathe and is caused to cover the whole surface of the deposited layers. When impregnation is over, the tube is slowly depleted at uniform rate.

According to the invention, there is also provided a method of producing optical fiber preforms, comprising a phase in which the core is doped by immersion of layers of the core material, deposited within a reaction tube at such temperature as to produce a porous soot, into a solution of dopant precursors. This solution is a solution in an anhydrous organic solvent, and the doping phase is carried out while the reaction tube is still mounted on the lathe by which it was supported during said layer deposition.

The invention further includes a method of producing optical fibres, wherein a preform whose core has been doped by a solution-doping technique is drawn; For this droping, a solution of a precursor of at least a first dopant in an anhydrous organic solvent is introduced into a reaction tube containing the material intended to form the core, while the tube is mounted on the lathe by which it was supported during such material deposition.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
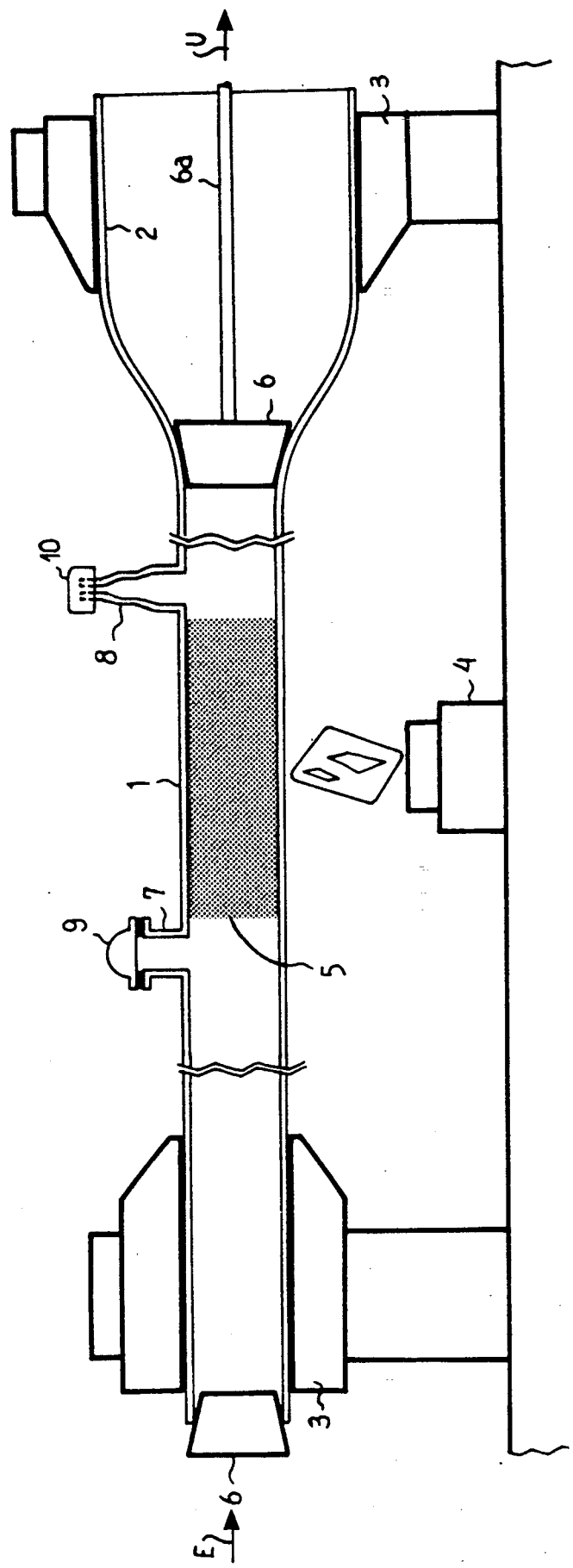
FIG. 1 is a schematic representation of a deposition tube to be used to perform the present invention.

FIG. 1 shows a conventional vitreous silica tube 1 for chemical vapor deposition of the materials designed to form the optical-fiber perform. The tube is mounted on a conventional lathe of a chemical vapour deposition apparatus, whose chucking system is schematized by mandrels 3. At the exhaust end, the reaction tube 1 is joined to a tube element 2 of greater diameter, in order to allow reaction tube rotation around its axis. An exhaust conduit for volatile reaction products opens into tube element 2. A conduit for the reactant introduction opens at the opposite end of reaction tube 1. These conduits are not shown for sake of simplicity of the drawings, and arrows E, U schematically represent such inlet and such exhaust, respectively. A heat source 4 can be moved along the axis of the tube while it rotates to produce a region 5 where the temperature is high enough to cause deposition of a silica soot layer, but not its vitrification. Tube 1 is equipped with sealing systems 6 at both ends and has a pair of radial branches 7, 8 placed at opposite ends of the deposition region 5 and provided with respective sealing means 9, 10. Branch 7 serves for introducing into and removing from tube 1 the dopant precursor solution; branch 8 serves for connection to a vacuum pump for tube drying.

Figure 2:
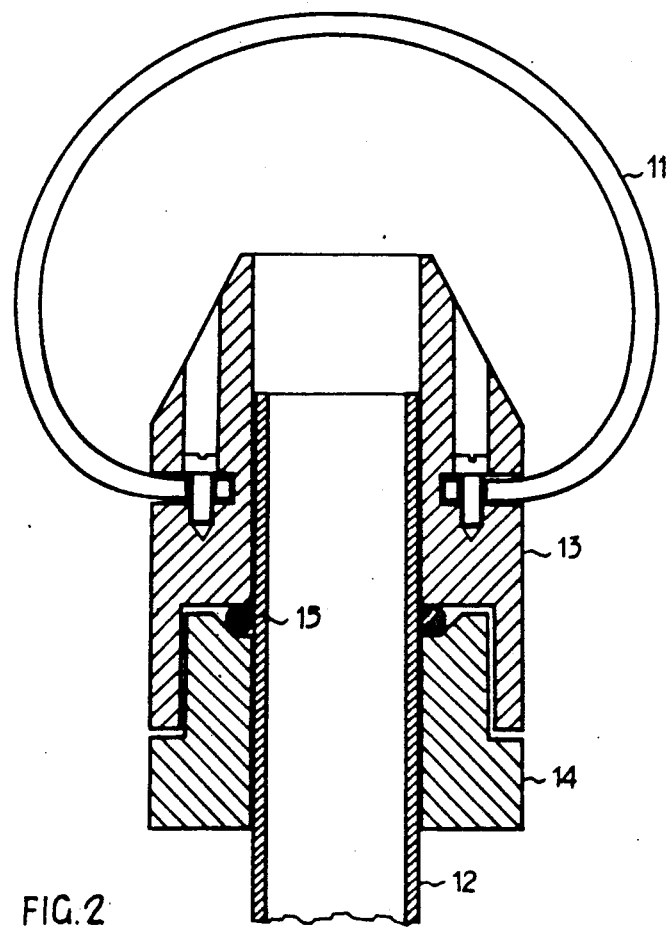
FIG. 2 is a cross-sectional view of a tube sealing system.

Sealing systems 6 can be rigid systems, as shown in FIG. 1, associated with rods 6a allowing them to be brought into or out of contact with the internal walls of the tube end portions. As an alternative, as shown in FIG. 2, each sealing system can consist of an inflatable elastomeric membrane 11 mounted at the end of a tube 12 connected to a compressed air source (not shown). Membrane 11 is fastened to a sleeve 13 which presents a threaded part designed to engage the corresponding threaded part of a second sleeve 14 rigidly connected to the tube 12. A gasket 15 ensures sealing between the two sleeves. During use, tubes 12 will be introduced through ends E, U of reaction tube 1 and a certain overpressure is created inside them to inflate membranes 11 and obtain sealing of tube 1.

The dopant solution used according to the present invention is a solution in an anhydrous organic solvent of a precursor of at least a first dopant suitable for raising the refractive index of the core without producing the central dip in the refractive index profile. Advantageously, also a precursor of a second dopant capable of to affecting the emission and absorption characteristics of the material is dissolved in said anhydrous organic solvent.

Preferably the first dopant is alumina, and the second dopant is a rare-earth oxide or a mixture of rare-earth oxides. In this case, the dopant precursors can be selected from chlorides, bromides, iodides or nitrates of aluminum or rare earths.

The solvent choice obviously depends on the dopant precursor used. More particularly, all the above salts of aluminum and rare earths have a certain degree of solubility in one or more of the following organic solvents: anhydrous alcohols, ketones, ethers.

The following table reports the solubility data for a number of such salts in a solvent of each of the specified groups. Quantitative data are expressed in grams per 100 cc of solvent. As to qualitative data "very soluble" indicates values of the order of 50 g/100 cc or more; "slightly soluble" indicates values of the order of 5 g/100 cc or less; "soluble" indicates intermediate values.

TABLE I

| | Solvent | | |
|---|---|---|---|
| Compound | absolute ethanol | ethyl ether | acetone |
| $AlCl_3$ | 100 | soluble | slightly sol. |
| $AlCl_3.6H_2O$ | 50 | soluble | |
| $Al(NO_3)_3.9H_2O$ | 100 | soluble | |
| $AlBr_3$ | soluble | | |
| $ErCl_3$ | soluble | | |
| $Er(NO_3)_3.5H_2O$ | soluble | soluble | soluble |
| $NdCl_3$ | 44.5 | | |
| $NdCl_3.6H_2O$ | very sol. | | |
| $Nd(NO_3)_3.6H_2O$ | soluble | soluble | |
| $CeBr_3(H_2O)$ | very sol. | | |
| $CeCl_3$ | 30 | | soluble |
| $CeI_3$ | very sol. | | |
| $Cen(NO_3)_3$ | 50 | | soluble |
| $TmCl_3.7H_2O$ | very sol. | | |
| $SmCl_3.6H_2O$ | very sol. | | |
| $Gd(NO_3)_3.H_2O$ | soluble | | |
| $PrCl_3$ | very sol. | | |
| $YbCl_3$ | soluble | | |

To achieve a satisfactory refractive index difference between core and cladding (in particular, a difference higher than $6.10^{-3}$), the first dopant precursor concentration should range from 0.8N to the solubility limit in the chosen solvent, and preferably it should not be lower than 1N.

The concentration of the possible second dopant precursor should be lower by at least one order of magnitude than that of the first dopant precursor.

When fabricating preforms doped with alumina only, if $AlCl_3$ is used as dopant precursor, suitable solvents are also carbon tetrachloride and alkyl and acyl halides. These halides react with $AlCl_3$ to produce solutions wherein complex $AlCl_4^-$ is present. An example of such reactions is the following:

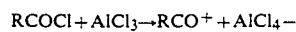

If AlBr$_3$ is used as dopant precursor for manufacturing preforms doped with alumina only, CS$_2$ could also be used as the solvent.

To better illustrate the invention, the manufacture of a fiber doped with Al$_2$O$_3$ and Er$_2$O$_3$ by using the tube of FIG. 1 will be disclosed by way of example. The materials for the preform core are deposited in a quite conventional way, by introducing the reactants (more particularly SiCl$_4$ and O$_2$) into tube 1, heated at a temperature of about 1500°–1600° C. by burner 4, so as to obtain an unvitrified silica layer some ten micrometers thick. Once the deposition is over, the tube is disconnected from the conduits for the reactant inlet and the gaseous reaction product exhaust, and the ends of tube 1 are closed by sealing systems 6 or by inflated membranes 11, while an inert and dehydrated gas (e.g. N$_2$ or Ar) is caused to flow through the tube. To this aim, branch 7 is opened and the gas is introduced through the reactant inlet, while the opposite tube end is closed; then, branch 8 is opened and the gas is introduced through branch 7, thus establishing a flow between branches 7 and 8. The reactant inlet end is then closed.

Subsequently, the non aqueous solution of dopant precursor is slowly introduced, e.g. a solution in ethyl alcohol of AlCl$_3$ and ErCl$_5$. The amount of solution introduced is such as to fill the whole tube. In an exemplary embodiment of the invention, the concentrations of the two dopant precursors were 1N and 0.1N, respectively. The solution is allowed to impregnate the soot for about 1 hour, whereafter it is allowed to flow out, e.g. by gravity, through the same branch 7 through which it had been introduced. After possible rinsing with suitable solvents (e.g. acetone), branch 8 of tube 1 is connected to a vacuum pump and the residual solvent in the tube is evaporated so as to obtain dry impregnated soot. Branches 7, 8 are then closed, sealing systems 6 are removed and the soot is washed with a mixture of O$_2$ and Cl$_2$ at about 700° C. to obtain a more complete dehydration of the soot and formation of Al$_2$O$_3$ and Er$_2$O$_3$. Vitrification and tube collapsing take then place according to the conventional techniques of preform manufacturing, and the preform is then drawn into a fiber in conventional manner.

A fiber obtained by the method described exhibited a refractive index difference between core and cladding of $7.5 \cdot 10^{-3}$. A fiber fabricated in a similar way, using an alcoholic solution of AlCl$_3$ only, still with a 1N concentration, exhibited a refractive index difference of $6.5 \cdot 10^{-3}$. Fibers fabricated by using AlCl$_3$ solutions with 0.2N and 0.05N concentrations presented an index difference of $2.2 \cdot 10^{-3}$ and $1.6 \cdot 10^{-3}$, respectively. This data allows evaluation of the influence of aluminum concentration in the attainment of good results.

Figure 6:
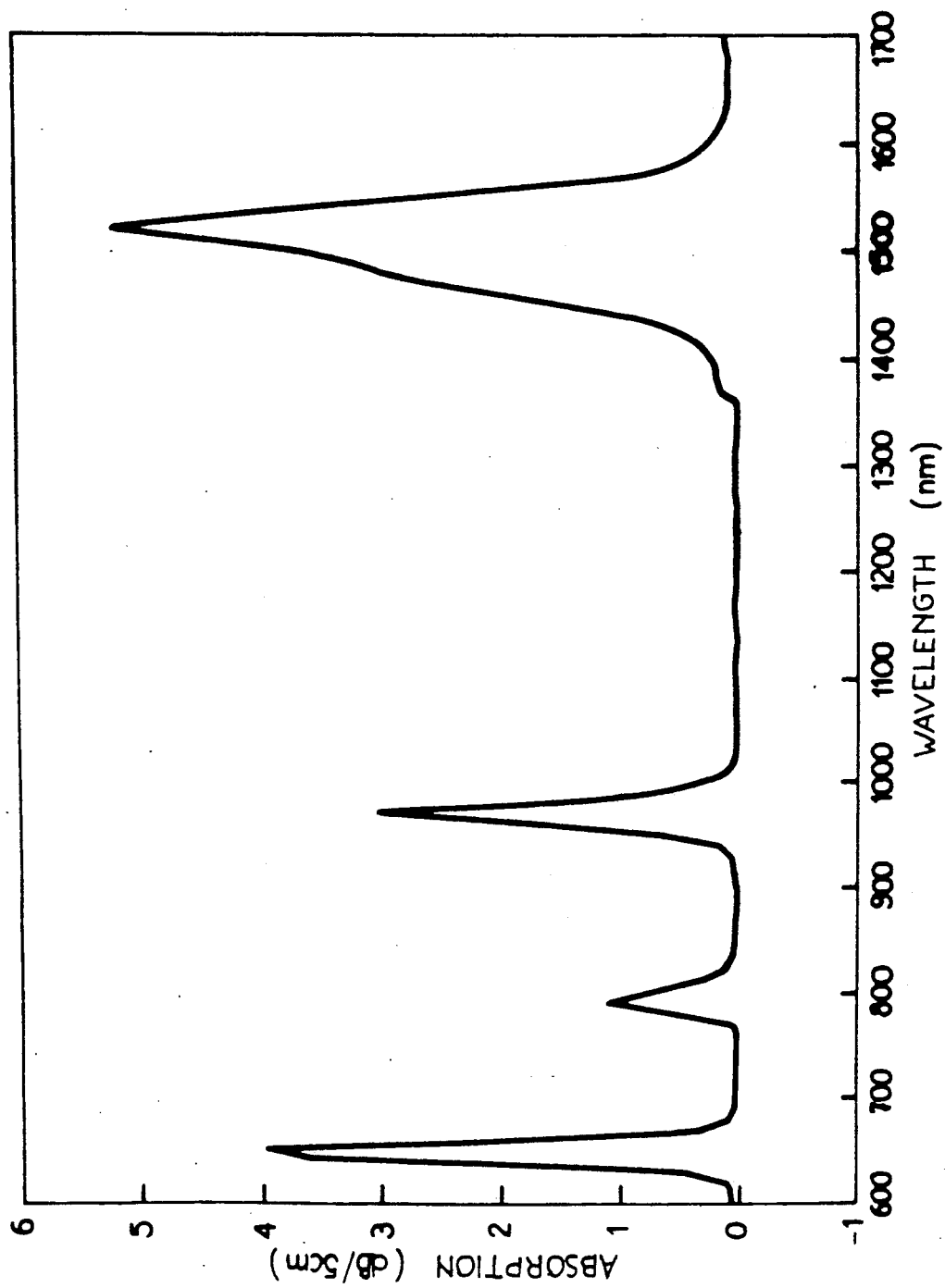
FIG. 6 shows the absorption spectrum of a fiber produced according to the invention.

FIG. 6 shows the absorption spectrum, in the visible and in the near-infrared, of the fiber obtained by drawing the Al$_2$O$_3$ and Er$_2$O$_3$ doped preform. Very low attenuations in correspondence with transmission windows and the low amplitude of the absorption peak of hydroxyl groups at 1380 nm can be clearly appreciated.

Figure 3:
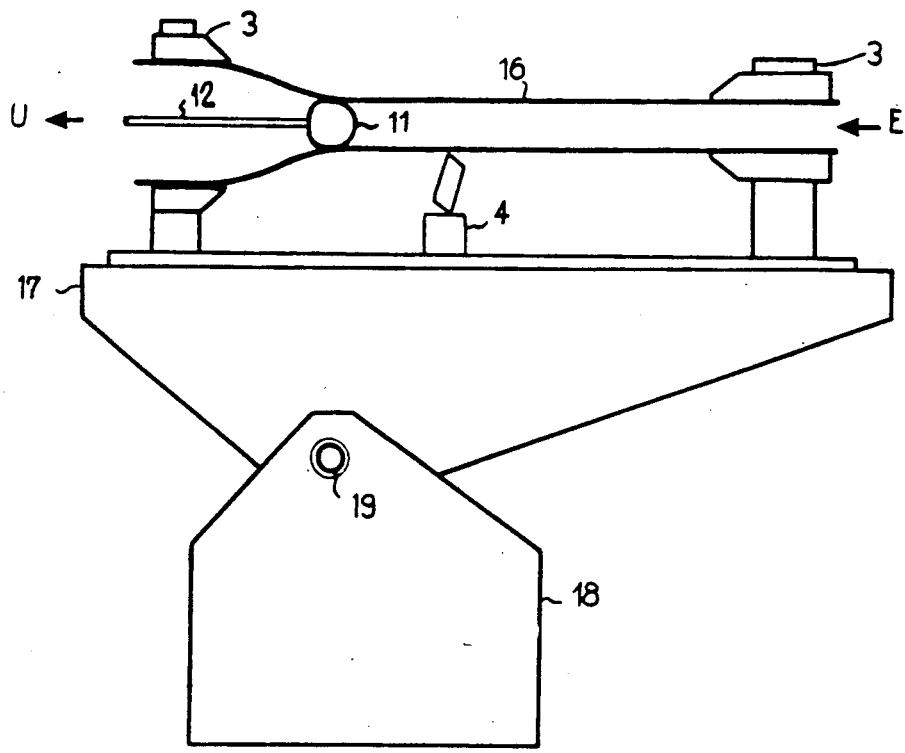
FIGS. 3 and 4 are schematic representations of a second embodiment of the invention, under two different working conditions.
Figure 4:
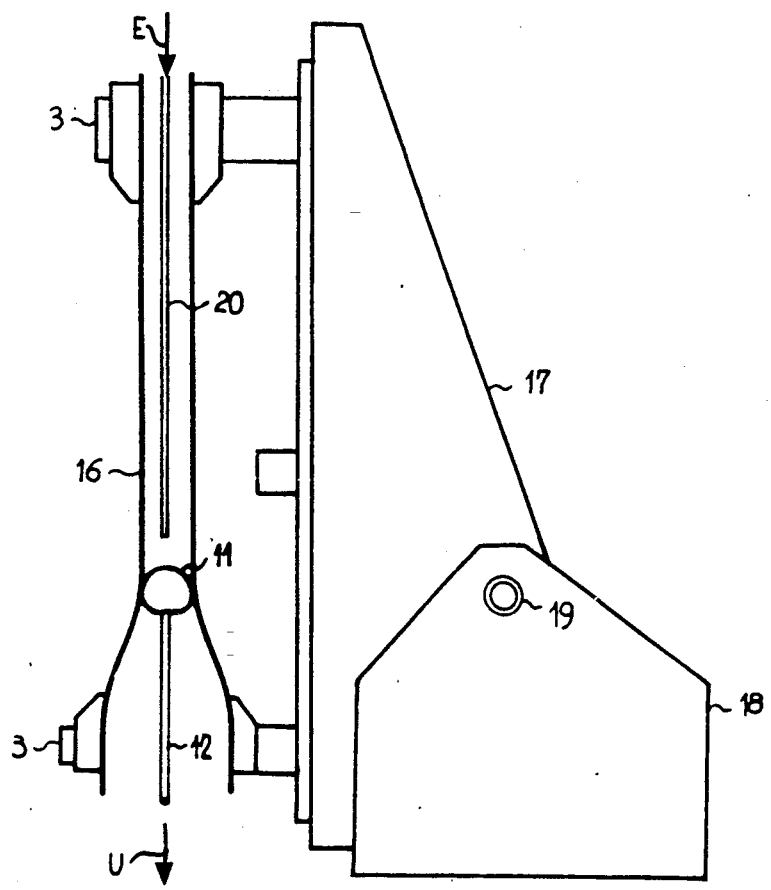

The method of the invention can be carried out also by using a perfectly conventional CVD tube, which however is to be mounted on a lathe where the mandrel support zone is movable in such a manner that the tube can be disposed either horizontally or inclined at an angle which can reach 90°. This embodiment is represented in FIGS. 3 and 4, where the elements corresponding to those of FIG. 1 are denoted by the same reference characters. The reaction tube 16 is, as said, a conventional CVD tube, i.e. a tube without branches 7, 8, and is mounted on a lathe having an upper portion 17, with mandrels 3, which is hinged on a base member 18 about to a horizontal axis 19, perpendicular to the axis of tube 16. The membrane sealing system of FIG. 2 is associated with the tube exhaust end.

Referring again to the fabrication of a fiber like that mentioned above, the deposition of the layers to be impregnated takes place also in this case in a quite conventional manner, with horizontal tube so that it is as shown in FIG. 3. At this point part 17 of lathe is rotated around axis 19, so as to arrange the tube inclined (more particularly vertical, FIG. 4) with the exhaust end down; then the reactant inlet and gas exhaust conduits are disconnected and the exhaust end is closed by membrane 11, while maintaining a flow of anhydrous and inert gas in tube 16. The impregnating solution is then introduced through the upper end of tube 16, by using another tube 20 which penetrates into tube 16 and is arranged so that the impregnating solution level slowly rises from the bottom. After impregnation, the pressure is reduced in membrane 11, so as to open again the tube exhaust end and to allow the solution to flow out. The outlet orifice must ensure that the tube is slowly emptied at uniform speed, to avoid damaging the impregnated soot layer. As an alternative, the solution can be sucked out through feeding tube 20. The tube is then slightly heated (at 50°–70° C.), while maintaining a flow of N$_2$ or Ar, to make the solvent evaporate from the impregnated material, and a mixture of O$_2$ and Cl$_2$ at about 700° C. is caused to pass in the tube to obtain a more complete dehydration of the soot and formation of Al$_2$O$_3$ and Er$_2$O$_3$. Vitrification and tube collapsing take then place according to the conventional techniques of preform manufacturing, and the preform is then drawn into a fiber in conventional manner.

Figure 5:
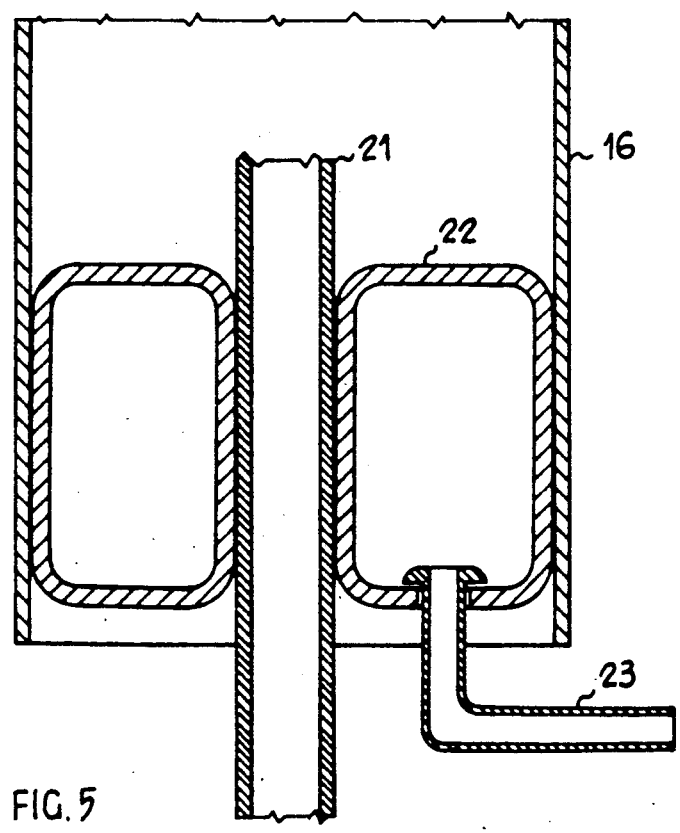
FIG. 5 is a partial view of a variant of the second embodiment of the invention.

In the variant shown in FIG. 5, relevant to the use of a tilting lathe like that of FIGS. 3, 4, introduction and removal of the dopant precursor solution take place through a tube 21 which is introduced into tube 16 from gas exhaust end U. For sealing end U of tube 16, a toroidal element 22 is provided, which surrounds the end of tube 21, is made of an elastomer (e.g. a silicone or polyurethane elastomer) and is connected through a pipe 23 to a compressed air source (not shown).

By this arrangement, after silica soot deposition, element 22 is inflated so as to adhere to the internal surface of reaction tube 16, thus sealing exhaust end U. During sealing, the inert gas flow is maintained as in the preceding cases. Then reaction tube 16 is slightly inclined and the solution is introduced through tube 21. After impregnation, the solution will flow out by gravity or will be sucked out through the same tube 21.

It is clear that even though in the example reference was made to a solution of AlCl$_3$ as precursor of the first dopant, that precursor could consist of a salt of another element, such as Zr, Mg and the like, capable of giving the fiber the desired properties, such salt presenting sufficient solubility at ambient temperature in anhydrous organic solvents such as ethanol or other anhydrous alcohols, ketones, ethers, alkyl or acyl halides, carbon tetrachloride or carbon sulphide.

We claim:

1. A method of doping a core of a silica-based fiber preform, comprising depositing a soot layer, which will form said core of said silica-based optical fiber preform, inside a reaction tube supported by a lathe, and connected to at least one deposition reactant inlet conduit and at least one exhaust conduit, and then impregnating the deposited core soot layer contained inside said reaction tube supported by said lathe with a solution of a precursor of at least a first dopant which raises the refractive index of said layer without giving rise to a central dip of said index, said solution of a precursor of said first dopant being a solution in an anhydrous organic solvent, wherein after said layer deposition, (a) the reaction tube is disconnected from the at least one deposition reactant inlet conduit as well as from the at least one exhaust conduit for the deposition reaction volatile products;

(b) at least a reaction product exhaust end of the reaction tube is sealed in a sealing operation, while an inert and anhydrous gas flow is maintained in said reaction tube during the sealing operation;

(c) said solution is introduced into the reaction tube, without removing the tube from the lathe so that the solution covers the whole surface of the deposited layer and impregnation of the deposited layer occurs; and (d) once impregnation is over, the solution is caused to slowly flow out, at a uniform rate, from the reaction tube, which reaction tube is still mounted on the lathe.

2. A method as claimed in claim 1 wherein a precursor of a second dopant modifying absorption and emission is also dissolved in said anhydrous organic solvent.

3. A method as claimed in claim 2 wherein the first dopant is alumina, and the second dopant is a rare-earth oxide or a mixture of rare-earth oxides.

4. A method as claimed in claim 1, wherein said dopant precursor is selected from the group consisting of chlorides, bromides, iodides and nitrates of elements whose oxides are to form the dopant.

5. A method as claimed in claim 1, wherein said anhydrous organic solvent is selected from the group consisting of alcohols, ketones, ethers, carbon tetrachloride, carbon sulphide, alkyl halides, and acyl halides.

6. A method as claimed in claim 1, wherein the first dopant precursor is present in the solution in a concentration whose normality has a value ranging from 0.8 to the solubility limit in the solvent.

7. A method as claimed in claim 6 wherein the first dopant precursor is present in the solution in a concentration whose normality is not less than 1.

8. A method as claimed in claim 1 wherein second dopant precursor is present in a concentration whose normality is lower by at least one order of magnitude than that of the first dopant precursor.

9. A method as claimed in claim 1 wherein the solution is introduced after the reaction tube has been disposed in an inclined position, with the exhaust end down, and said exhaust end has been sealed.

10. A method as claimed in claim 1 wherein said solution is introduced through a second tube penetrating into the reaction tube and ending near the exhaust end of the reaction tube.

11. A method as claimed in claim 10 wherein the solution is removed by sucking it out through said second tube.

12. A method of doping a core of a silica-based fiber preform, comprising depositing a soot layer, which will form said core of said silica-based optical fiber preform, inside a reaction tube supported by a lathe, and connected to at least one deposition reactant inlet conduit and at least one exhaust conduit, and then impregnating the deposited core soot layer contained inside said reaction tube supported by said lathe with a solution of a precursor of at least a first dopant which raises the refractive index of said layer without giving rise to a central dip of said index, said solution of a precursor of said first dopant being a solution in an anhydrous organic solvent, wherein after said layer deposition, (a) the reaction tube is disconnected from the at least one deposition reactant inlet conduit as well as from the at least one exhaust conduit for the deposition reaction volatile products;

(b) at least a reaction product exhaust end of the reaction tube is sealed in a sealing operation, while an inert and anhydrous gas flow is maintained in said reaction tube during the sealing operation;

(c) said solution is introduced into the reaction tube, without removing the tube from the lathe so that the solution covers the whole surface of the deposited layer and impregnation of the deposited layer occurs; and (d) once impregnation is over, the solution is caused to slowly flow out, at uniform rate, from the reaction tube, which reaction tube is still mounted on the lathe, a sealing of an exhaust end of the reaction tube being effected by a resilient membrane mounted on a conduit which is coaxial with the reaction tube and in which an overpressure is established.

13. A method of doping a core of a silica-based fiber preform, comprising depositing a soot layer, which will form said core of said silica-based optical fiber preform, inside a reaction tube supported by a lathe, and connected to at least one deposition reactant inlet conduit and at least one and then impregnating the deposited core soot layer contained inside said reaction tube supported by said lather with a solution of a precursor of at least a first dopant which raises the refractive index of said layer without giving rise to a central dip of said index, said solution of a precursor of said first dopant being a solution in an anhydrous organic solvent, wherein after said layer deposition, (a) the reaction tube is disconnected from the at least one deposition reactant inlet conduit as well as from the at least one exhaust conduit for the deposition reaction volatile products;

(b) at least a reaction product exhaust end of the reaction tube is sealed in a sealing operation, while an inert and anhydrous gas flow is maintained in said reaction tube during the sealing operation;

(c) said solution is introduced into the reaction tube, without removing the tube from the lathe so that the solution covers the whole surface of the deposited layer and impregnation of the deposited layer occurs; and (d) once impregnation is over, the solution is caused to slowly flow out, at uniform rate, from the reaction tube, which reaction tube is still mounted on the lathe the solution being introduced after the reaction tube is disposed in an inclined position with an exhaust end down, via a further tube penetrating inside the reaction tube through said exhaust end, and is removed through said further tube, by gravity or by sucking, the exhaust end of the reaction tube being sealed by means of an inflatable elastomeric toroidal member placed between the internal surface of the reaction tube and the external surface of said further tube.

14. A method of doping a core of a silica-based fiber preform, comprising depositing a soot layer, which will form said core of said silica-based optical fiber preform, inside a reaction tube supported by a lathe, and connected to at least one deposition reactant inlet conduit and at least one exhaust conduit and then impregnating the deposited core soot layer contained inside said reaction tube supported by said lathe with a solution of a precursor of at least a first dopant which raises the refractive index of said layer without giving rise to a central dip of said index, said solution of a precursor of said first dopant being a solution in an anhydrous organic solvent, wherein after said layer deposition, (a) the reaction tube is disconnected from the at least one deposition reactant inlet conduit as well as from the at least one exhaust conduit for the deposition reaction volatile products;

(b) at least a reaction product exhaust end of the reaction tube is sealed in a sealing operation, while an inert and anhydrous gas flow is maintained in said reaction tube during the sealing operation;

(c) said solution is introduced into the reaction tube, without removing the tube from the lathe so that the solution covers the whole surface of the deposited layer and impregnation of the deposited layer occurs; and (d) once impregnation is over, the solution is caused to slowly flow out, at uniform rate, from the reaction tube, which reaction tube is still mounted on the lathe, the solution having been introduced after the reaction tube is disposed in an inclined position with an exhaust end down, via a further tube penetrating inside the reaction tube through said exhaust end, and said solution is removed through said further tube, by gravity or by sucking, the solution introduction and removal taking place, after sealing of opposite ends of the reaction tube, through a first radial branch of the reaction tube, said radial branch being connected to the reaction tube near one end of a deposition zone of the layer to be impregnated.

15. A method as claimed in claim 14 wherein the flow of anhydrous and inert gas is maintained during the sealing of both ends of the reaction tube.

16. A method as claimed in claim 15 wherein said gas flow is maintained between the inlet end and said first branch, while the exhaust end is being sealed, and is maintained between the first branch and a second branch, ending in the reaction tube near the opposite end of said deposition zone, while the inlet end is being sealed.

17. A method as claimed in claim 14, wherein the sealing of the tube end is obtained by respective resilient membranes mounted on a conduit which is coaxial with the reaction tube and in which an overpressure is established.

* * * * *